A. WRIGHT.
Carriage Seat.

No. 101,959.   Patented April 12, 1870.

Witnesses
James Moore
Higgins

Inventor
Alexander Wright

United States Patent Office.

ALEXANDER WRIGHT, OF WILMINGTON, DELAWARE.

Letters Patent No. 101,959, dated April 12, 1870.

IMPROVEMENT IN ADJUSTABLE CARRIAGE-SEATS.

The Schedule referred to in these Letters Patent and making part of the same.

*To all whom it may concern:*

Be it known that I, ALEXANDER WRIGHT, of the city of Wilmington, in the county of New Castle and State of Delaware, have invented certain Improvements in Adjustable Carriage-Seats; and I do hereby declare that the following is a full, clear, and exact description of the construction and operation of the same, reference being had to the annexed drawings making a part of this specification, in which—

Figure 1:
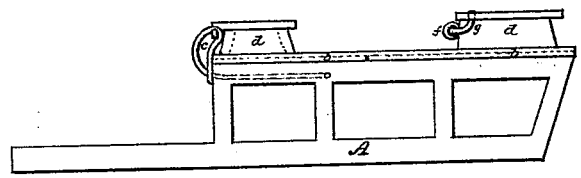
Figure 1 is a side elevation of the carriage-body and seats, embodying my invention.
Figure 2:
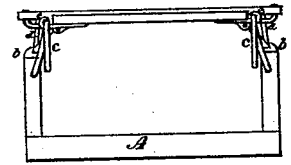
Figure 2 is an elevation, showing the front of the carriage-body, which is at the left hand in fig. 1, bringing in view the hooks connecting the seat with the sliding rod.
Figure 3:
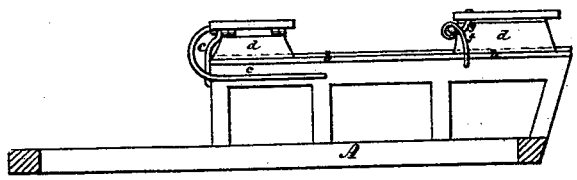
Figure 3 is a vertical longitudinal section, showing one of the ways, the sliding rod for carrying the seat out of place, and the seat-supports.
Figure 4:
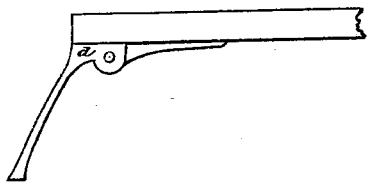
Figure 4 is an end view of the seat-support.
Figure 5:
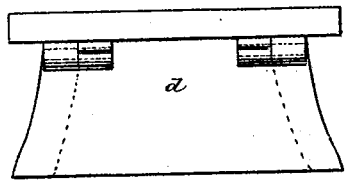
Figure 5 is a side view of the seat-support.

Nature and objects of the Invention.

My invention relates to the combination of ways and sliding rods with hinged seat-supporters and hooks, in such a manner that the seats may be readily moved to any position desired; the object of my invention being to furnish a carriage with one or two seats, at pleasure, without taking them from the carriage, and when one seat only is needed, to instantly throw one seat under the other, entirely out of the way.

General Description.

A is the body of the carriage, in skeleton.

$b\ b$ are the ways upon which the back seat slides, and which holds both seats down to their place.

$c\ c$ are the rods on which the the front seat slides, in reversing and passing into position to bring the back seat over it.

$d\ d$ are the hinged seat-supporters, used in place of arms or legs.

$e\ e$ are the hooks, which hold the front seat in place, and bind it to the rods $c\ c$ in traversing the same while shifting.

$f\ f$ are the stays, which hold the hind seat in place, fastened thereto by means of the catches $g\ g$, which are used, when the back seat is moved forward, to hold it in place, by entering the returned ends of the sliding rods $c\ c$.

If the carriage is to be provided with one seat only, the front seat is raised forward, and forced downward and backward upon the sliding rods; the back seat is freed from its position, slid forward over the front seat so displaced, and fastened to the end of the sliding rods to keep it in place; and all that is required to make the vehicle two-seated again is to reverse the operation, which takes but a moment.

Disclaimer and Claims.

I do not claim as my invention the shifting of one seat under the other, for this has been done long since by other inventors; but

I claim as my invention—

1. The use of the ways $b\ b$, substantially as and for the purposes hereinbefore set forth.

2. The hinged seat-supporters $d\ d$, substantially as and for the purposes hereinbefore mentioned.

3. The sliding rods $c\ c$, substantially as and for the purposes hereinbefore mentioned.

4. The front seat, with its hinged supports and hooks $e\ e$, in combination with the sliding rods $c\ c$, substantially as and for the purposes hereinbefore specified.

5. The combination, with the seats and hinged supporters $d\ d$, of the sliding rods $c\ c$, ways $b\ b$, catches $g\ g$, and stays $f\ f$, substantially as and for the purposes hereinbefore set forth.

ALEXANDER WRIGHT.

Witnesses:
 E. I. TAYLOR,
 J. S. VALENTINE.